Figure 1:
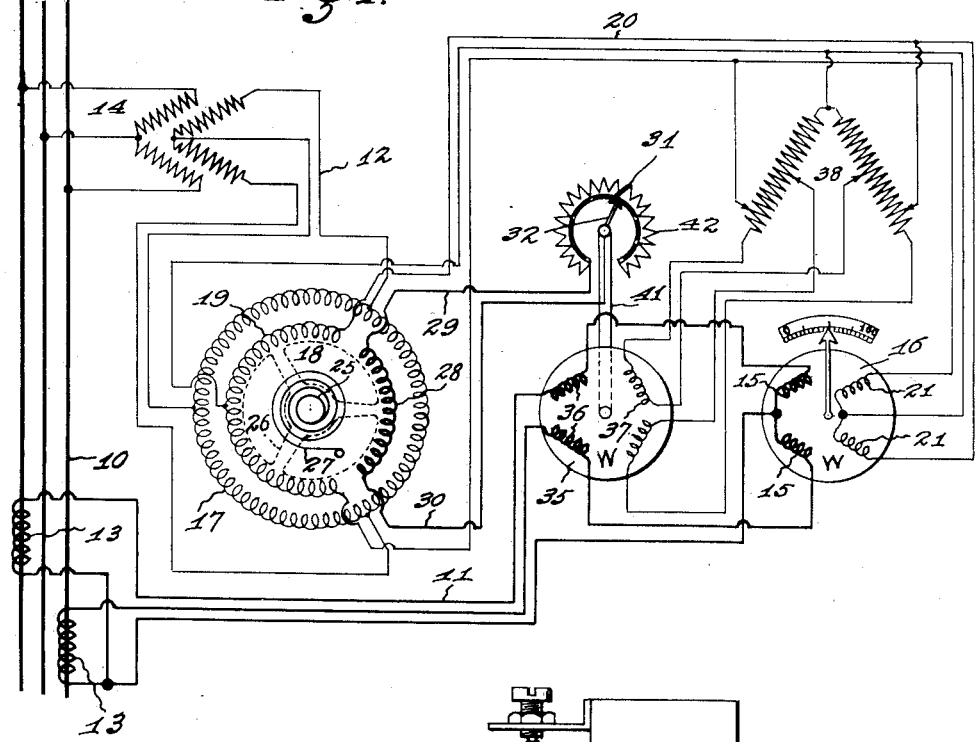

Feb. 21, 1933.  S. S. GREEN  1,898,828

PHASE CONTROL

Filed March 2, 1931

Inventor
STANLEY S. GREEN,

By Ashley & Track
Attorneys

Patented Feb. 21, 1933

1,898,828

UNITED STATES PATENT OFFICE

STANLEY S. GREEN, OF LA FAYETTE, INDIANA

PHASE CONTROL

Application filed March 2, 1931. Serial No. 519,640.

It is the fundamental object of my invention to produce a phase control which is accurate, simple, and operable by a minimum amount of power.

Perhaps the most ready application of this phase control is to measure the volt-amperes of a multi-phase alternating-current circuit; and to do so by a process and apparatus which makes it possible to obtain such measurement by an ordinary A. C. wattmeter, connected to the main circuit in such wise that the current in the current-coils and the potential on the potential-coils of the measuring wattmeter are maintained in a given time-phase relationship regardless of variations in the power-factor in the main circuit, and by apparatus inherently self-adjusting so that there is no necessity for special calibration.

In carrying out my invention, considered rather specifically and as applied to measuring volt-amperes, I supply the current of the main circuit in which the volt-amperes are to be measured to the current coils of the measuring wattmeter, either directly or through current transformers. I supply the potential of such main circuit, either directly or through potential transformers, to the primary windings of a phase-shifter; and the secondary windings of such phase-shifter supply a derived potential to the voltage coils of the measuring wattmeter. This derived potential from the secondary windings of the phase-shifter is fixed in magnitude with respect to the potential of the main circuit, but is controllably shiftable in time-phase relation with respect to it; and is shifted automatically to maintain a fixed time-phase relation between the current in the current coils and the potential supplied to the voltage coils of the measuring wattmeter.

To obtain this automatic shifting, the primary and secondary coils of the phase-shifter are relatively angularly shiftable, as by having the primary coils fixed and the secondary coils rotatably mounted on a shaft. This carrying shaft and the coils mounted thereon are biased in one direction, as by a spiral spring. The phase-shifter is also provided with a motor coil, conveniently on its rotating member; and the pull of this motor coil opposes the pull of the spring. The pull of this motor coil depends upon the current flow through it; and such current flow is controlled, as through a rheostat, by a control motor of the wattmeter type having its current coils supplied by said main-circuit current and its voltage coils supplied through phasing transformers with a potential which has a definite time-phase relation with the derived potential which the secondary windings of the phase-shifter supply to the voltage coils of the measuring wattmeter. This definite time-phase relation is desirably 90°, as such quadrature relation serves to maintain zero phase-displacement between the current in the current coils and the potential on the voltage coils of the measuring wattmeter; but this quadrature relation, although desirable, is not essential, and any other desired constant time-phase relation may be used if proper correction is made in the reading of the measuring wattmeter, which correction will itself be a constant.

Figure 2:
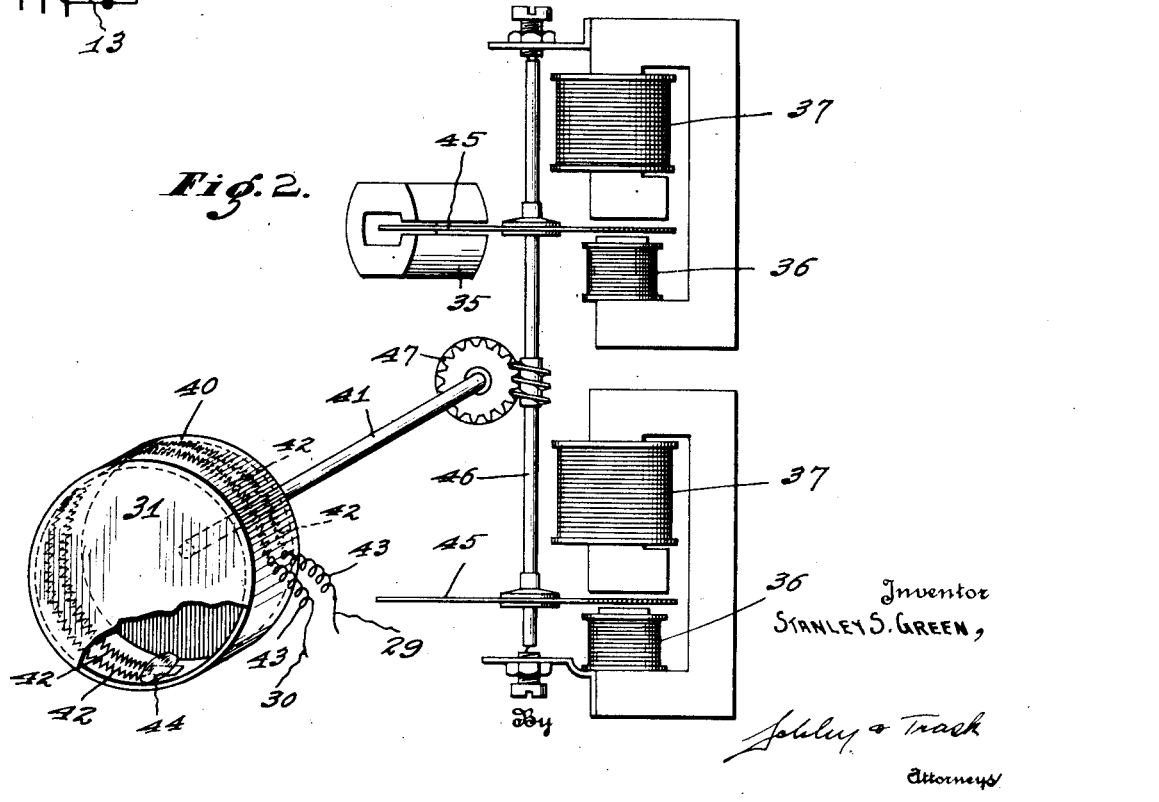

The accompanying drawing illustrates my invention: Fig. 1 is a diagrammatic view showing my invention, with only those constructional details shown that are essential for an understanding of the principles involved; and Fig. 2 is a more detailed view, although still diagrammatic, of a desirable form of control motor and control rheostat.

The main alternating-current circuit 10 in which the volt-amperes are to be measured is shown as a 3-phase 3-wire circuit. This is merely by way of example, as the main alternating-current circuit may have any number of phases and any number of wires, so long as it has at least two phases.

From the main circuit 10 I derive a current-circuit 11 and a potential-circuit 12, responsive respectively to the current and to the voltage of the main circuit and so having respectively a current and a potential which are proportional to and in phase with those of the main circuit. With the 3-phase 3-wire circuit shown, I may do this by open-delta connections: as through a pair of current transformers 13 which supply to the 3-wire current-circuit 11 a current proportional to and in definite time-phase relationship with the current in the main circuit; and through a pair of V-connected potential transformers 14 which supply to the 3-wire potential-circuit 12 a potential proportional to and in definite time-phase relationship with the potential of the main circuit. Thus the current in the current-circuit 11 and the potential in the potential-circuit 12 bear substantially the same time-phase relationship to each other as do the current and the potential of the main circuit. The current and potential transformers 13 and 14 are used when necessary to get a current and a potential of proper magnitude in the respective circuits 11 and 12, when those of the main circuit make that desirable; for of course those transformers need not be used when and if the current and voltage values of the main circuit are of magnitudes suitable for direct application to measuring instruments.

One of the circuits 11 and 12, desirably the current-circuit 11, supplies the current windings 15 of a wattmeter 16; which is to measure the volt-amperes of the main circuit. The other of said circuits 11 and 12, desirably the potential-circuit 12, is not connected directly to any coils of this measuring wattmeter 16, but instead is connected to the primary windings 17 of a phase-shifter 18. That is, although my invention in its broader aspects does not exclude connecting the phase-shifter in the current-circuit which leads to the measuring wattmeter and applying potential from the main circuit 10 directly to the potential coils of such measuring wattmeter without phase-shifting, I prefer to connect the phase-shifter and to do the phase-shifting in the potential-circuit; because the values involved and the balance between phases are usually more nearly constant in the potential-circuit than in the current-circuit, and hence will give more reliable and uniform operation with the phase-shifter and will involve rather more simple apparatus.

The measuring wattmeter 16 is shown diagrammatically, and for simplicity is shown as a simple indicating type of meter, with a pointer moving over a scale. However, this is merely for simplicity, as the measuring wattmeter 16 may be of any desired type, whether indicating or integrating. Therefore, the character of the wattmeter 16 will be chosen of the proper type for indication or integration as the circumstances require. Indeed, in the broader aspects of my invention, this wattmeter 16 is only one example of an instrument which is responsive to the product of the potential and an arbitrarily chosen time-phase component of the current supplied to it. The usual form of such instrument is of the wattmeter type, and in such type the most common arbitrarily chosen time-phase component of the product of the current and potential to which the instrument responds is the in-phase component. Thus, the indications of an ordinary wattmeter are proportional to the component of current which is in phase with the potential, multiplied by this potential.

In addition to its primary windings 17, the phase-shifter 18 also has secondary windings 19. As shown, the primary windings 17 are connected in delta, and the secondary windings 19 are connected in open-delta; although these connection schemes are not necessary in either case.

The secondary windings 19 of the phase-shifter supply a 3-wire 3-phase circuit 20, which leads to and supplies the voltage coils 21 of the measuring wattmeter 16. Both the current coils 15 and the voltage coils 21 of the measuring wattmeter 16 are shown connected in open-delta in the diagram of Fig. 1; and that is a convenient although not a necessary connection scheme in both instances.

The potential of the circuit 20 may be designated as the derived potential. Its magnitude is proportional to the potential of the main circuit 10.

But the time-phase position of the derived potential with respect to the potential of the main circuit 10 is variable, and depends on the relative positions of the primary and secondary windings 17 and 19 of the phase-shifter. To obtain the variation in relative position between the two sets of phase-shifter windings, one of them is mounted for rotation, as on a shaft 25, shown diagrammatically in Fig. 1 as having arms 26 (in dotted lines) which carry the movable windings. As shown, the movable windings are the secondary windings 19. A suitable biasing mechanism, desirably a spiral spring 27, tends to turn the shaft 25 and the secondary windings carried thereby in one direction, shown as counter-clockwise in Fig. 1. If a spring, it acts with a force directly proportional to the extent of its stressing; although that force need not be accurately pre-calculated, and its value is not determinative of the control. This turning action by the spring 27 is opposed by a controllably energized motor coil 28 on the phase-shifter, that is, the spring 27 and the motor coil 28 have opposing actions on the shaft 19, tending to turn it in opposite directions, and the one which at any time is predominant succeeds in making its turning tendency effective until by the resultant movement thereby produced a condition of equilibrium is obtained. Whenever this condition of equilibrium is destroyed, there is a movement of the shaft 25 and the parts carried thereby in the proper direction and amount to restore it.

The motor coil 28 is shown as mounted on the rotating or secondary member of the phase-shifter 18; and as being angularly located on that part thereof which is left between the ends of the arms of the open-delta connection of the secondary windings 19. As a structural result, the secondary windings 19 and the motor coil 28 may in effect form a complete winding for the phase-shifter rotor, although the two are desirably not electrically interconnected. The motor coil 28 acts as the secondary winding of an induction motor, of which the windings 17 are the primary windings; and the reaction between the magnetic fields of the primary windings 17 and of the motor coil 28 tends to produce a movement of the shaft 25 and the parts carried thereby, in a clockwise direction as shown, or in other words in the opposite direction from the movement which the spring 27 tends to produce. The current in the secondary coils 19, as well as in the rotor iron losses, also react with the magnetic field produced by the current in the primary windings 17 to produce a torque, which adds to that due to the motor coil 28; but the torque due to the secondary coils 19 and to the rotor iron losses is relatively small in amount, and for a given burden on the secondary coils 19 remains substantially constant regardless of the position of the phase-shifter, so that it may be disregarded.

The pull due to the motor coil 28, however, depends upon the current flow through that coil; and is varied to produce the desired result. The circuit including the motor coil 28 has a certain alternating-current impedance, and any variation of this impedance varies the current in such motor coil. This impedance may be varied by changing either of its components—that is, by varying either the resistance or the reactance of such circuit. Although in the broadest sense it is the impedance of the circuit which contains the motor coil 28 that is varied, I prefer to vary the resistance component of such impedance. To this end, the terminals of the motor coil 28 are connected by wires 29 and 30 to a rheostat 31, through which the circuit of the motor coil 28 is completed. The amount of current flow through the motor coil 28, and therefore the torque exerted thereby, is dependent upon the resistance of that part of the rheostat 31 which is in circuit. This rheostat is shown diagrammatically in Fig. 1 as having a controlling arm 32 by which such resistance may be controlled; but in practice this rheostat may be of any character desired, and is desirably one which offers substantially no frictional resistance to its movement. Such a substantially frictionless rheostat is illustrated diagrammatically in Fig. 2, and will be described more in detail hereinafter.

The movable part of the rheostat 31, shown in Fig. 1 diagrammatically as the arm 32, is automatically operated by a control motor 35 to vary the effective resistance of the rheostat in such direction and amount that the pull of the motor coil 28 is increased or decreased as necessary to cause the movable part of the phase-shifter to move as may be necessary to maintain the desired definite time-phase relation between the derived potential (in the circuit 20) and the current (in the circuit 12), which directly supply the measuring wattmeter 16. This definite time-phase relation is desirably such that said derived potential and the current which are supplied to the measuring wattmeter are in phase—that is, that the time-phase displacement between that derived potential and that current is zero.

The control motor 35 which operates the rheostat 31 is desirably of the induction-watthour-meter type, with two sets of coils 36 and 37 corresponding in general to the coils 15 and 21 of the measuring wattmeter 16.

The coils 36 of the control motor 35 are connected in series with the coils 15 of the measuring wattmeter 16, so that they are supplied with the current of the circuit 12.

The coils 37 of the control motor 35 are supplied from the derived-potential circuit 20 through a pair of phasing transformers 38, shown as connected in open-delta. The phasing transformers 38 supply the control-motor coils 37 with potential which is displaced by a definite time-phase angle from the derived potential, although proportional thereto in magnitude. As shown, this time-phase angle is 90°, so that potential which is supplied to the control-motor coils 37 is in quadrature with the derived potential; as thereby I get the most efficient action of the measuring wattmeter 16, since it results in zero time-phase displacement between the current in the coils 15 and the potential supplied to the coils 21 of such measuring wattmeter, as will be described. However, this quadrature relationship is merely desirable, and not essential, as any other fixed but dephased time-phase relationship may be provided between the potential on the coils 37 of the control motor 35 and the derived potential in the circuit 20 so long as that time-phase relationship is a substantially constant one. In the broad aspects of the invention the phasing transformers 38 and the control motor 35, taken together as a combined unit, may be considered as a motor-device responsive to the product of a different time-phase component of the current and potential than that component to which instrument 16 is responsive. It is not necessary that the phasing transformers be separated from the motor 35. This has been so shown merely for clarity and it is well known in the art that motor devices may be constructed in which the effect of control motor 35 and phasing transformers 37 are combined in one unit or instrument.

In Fig. 2 I show a desirable form of rheostat 31 and the control motor 35 which operates it, although still somewhat diagrammatically. In that desirable form, the rheostate 31 consists of a horizontal-axis drum 40, which is mounted on an operating shaft 41 and which has exposed on its internal curved surface the resistance wires 42 of the rheostat, arranged in two parallel arcs. The corresponding ends of these wire-arcs 42 are connected by flexible connections 43 to the wires 29 and 30 which lead from the motor coil 28 of the phase-shifter. Within the drum 40 is a small amount of mercury 44; which lies at the bottom of the drum in all positions of the latter as it turns, and cross-connects the two parallel resistance wires 42 at points which depend on the position of the drum 40. By turning the drum 40 and thus varying the point of such cross-connection, the effective resistance of the rheostat 31 is varied; and because of the nature of the rheostat, such turning may be effected with substantially no frictional resistance.

The control motor 35 in Fig. 2 consists of two separate single-phase induction meters of the watthour-meter type, each of such motors having one of the coils 36 and one of the coils 37. The two single-phase meters act on the usual meter-disks 45, shown as on the common shaft 46 connected by suitable gearing 47 to the shaft 41 that operates the rheostat 31.

In operation, the current in the current-circuit 11 is proportional to the current in the main circuit 10, and the potential of the potential-circuit 12 is proportional to the potential of the main circuit 10; and the current in the circuit 11 and the potential of the circuit 12 bear the same time-phase relationship to each other as do the current and the potential of the main circuit 10. The current in the current-circuit 11 goes through the coils 36 of the control motor 35, and through the windings 15 of the measuring wattmeter 16. The potential of the potential circuit 12 is supplied to the primary windings 17 of the phase-shifter 18, to produce a rotating magnetic field. This rotating magnetic field generates an E. M. F. or potential in the secondary windings 19 of the phase-shifter, and this potential is the derived potential which is impressed on the derived-potential circuit 20 and on the potential coils 21 of the measuring wattmeter 16. This derived potential is proportional to the potential in the potential-circuit 12, and therefore proportional to the potential of the main circuit 10; and if, as is convenient, the phase-shifter has a 1-to-1 transformer ratio, the derived potential is equal in magnitude to the potential in the potential-circuit 12. The time-phase relationship between the derived potential and the potential in the potential-circuit 12, and therefore between the derived potential and the potential of the main circuit, depends on the angular position of the rotor of the phase-shifter 18.

The current in the current coils 15 and the potential on the potential coils 21 of the measuring wattmeter 16 cooperate to produce an actuation of that wattmeter by watts—that is to say, to produce a reading which is proportional to and may be identical with the product of the following three factors:

a The potential applied to the potential coils 21;

b The current passing through the current coils 15;

c The cosine of the angle of displacement in time between potential a and current b.

Since volt-amperes and watts are identical when the angle of displacement in time between the current and the voltage in the circuit being measured is zero, because the cosine of 0° is unity, it follows that if the third factor (c) mentioned above be maintained at unity regardless of the variations in the angle of displacement in time-phase between the current and the voltage of the main circuit the measurement produced by the wattmeter 16 will in reality be a measurement of volt-amperes. To obtain this, the control must be such that the cosine which is factor c above mentioned shall be unity under all conditions—that is to say, the angle of time-phase displacement between the current in the current-circuit 11 and in the current coils 15 of the measuring wattmeter 16 and the derived potential on the potential-circuit 20 and on the potential coils 21 of said measuring wattmeter must be kept equal to zero regardless of variations of power-factor in the main circuit. Or, that angle of time-phase displacement may be maintained at any constant value, even though not zero; in which case the measurement produced by the wattmeter will still be proportional to volt-amperes, and may be converted into true volt-amperes by a constant correction factor—which is the reciprocal of the cosine of such angle.

This constancy of angle is obtained through the action of the phasing transformers 38, the control motor 35, the rheostat 31, and the phase-shifter 18.

Since the derived potential in the circuit 20 supplies the phasing transformers 38, as well as the potential coils 21 of the wattmeter 16, and de-phased potential from the phasing transformers 38 is supplied to the coils 37 of the control motor 35, the potential on such coils 37 is out of phase by a definite angle from the derived potential which is impressed on said wattmeter potential coils 21—desirably in quadrature therewith. The control motor potential coils 37 produce a magnetic flux which reacts with that produced by the control-motor current coils 36. Since the control motor 35 is of the wattmeter type, it also is actuated by a torque proportional to the product of three factors, which in this case are:

$d$ The potential applied to the potential coils 37;

$e$ The current passing through the current coils 36;

$f$ The cosine of the angle of displacement in time between potential $d$ and current $e$. Therefore, if in the control motor 35 the factor $f$ is made zero, such control motor exerts no torque, and so remains at rest. Factor $f$ becomes zero when the angle between the potential on coils 37 and the current in the coils 36 of the control motor is 90°—or, in other words, when potential $d$ and current $e$ are in quadrature. Under those conditions, therefore, the control motor 35 remains at rest, and the rheostat 31 remains stationary. But if factor $f$ departs from zero, as it does if the angle between the potential on the coils 37 and the current in the coils 36 varies from 90°, the control motor 35 develops a torque; in one direction or the other according as such angle becomes greater than or less than 90° and so according as factor $f$ becomes minus or plus.

Since factors $b$ and $e$ are identical in value, and factors $a$ and $d$ are likewise identical in value but displaced from each other in time by the angle of de-phasing of the phasing transformers 38, it follows that when factor $f$ is zero because of the existance of quadrature between factors $d$ and $e$ then factor $c$ is not only the cosine of the angle of displacement in time between factors $a$ and $b$ but is also the sine of the dephasing angle of the phasing transformers 38. Therefore, if the phase-shift produced by the phasing transformers 38 is 90°, as assumed for convenience, when factor $f$ is zero, factor $c$ is unity; and, as a result, the reading of the measuring watt-meter 16 of volt-amperes direct.

On the other hand, if the phase-shift produced by the phasing transformers 38 is something other 90°, then when factor $f$ is zero, which is the condition for having the control motor 35 remain at rest, factor $c$ will be less than unity; so that in order to get volt-amperes from the reading of the measuring wattmeter 16 it is necessary to multiply such readings by a constant correction factor, which is the reciprocal of the sine of such angle of de-phasing or the reciprocal of the cosine ($c$) of the angle of time-phase displacement which is maintained between factors $a$ and $b$. It is in order to escape the necessity for such calculation that it is desirable that the de-phasing angle shall be 90°.

Assume that factor $f$ is zero, and that the control motor 35 is consequently at rest. Under those conditions, the measuring wattmeter 16 is measuring volt-amperes, either directly or by dividing its reading by the sine of the angle of de-phasing of the phasing transformers 38. Under these conditions the phase-shifter 18 is also at rest, with the pull of the motor coil 28 just balancing the pull of the spring 27. This is so regardless of what the power-factor of the main circuit 10 may be, so long as such power-factor remains constant.

However, if the power-factor of the main circuit 10 varies, factors $c$ and $f$ immediately also vary; and if no correction were immediately made the reading of the measuring wattmeter 16 would give no true indication either directly or indirectly of volt-amperes. However, a correction is immediately made. This is due to the fact that factor $f$ has departed from zero, which results in the production of a torque in one direction or the other in the control motor 35. Because of such torque, the control motor rotates the shaft 41, to vary the effective resistance of the rheostat 31, by increasing or decreasing such resistance as the case may be. As the result of this change in the effective resistance of the rheostat 31, the current in the motor coil 28 is also varied (in inverse sense to the variation in resistance), and this produces a change in the pull exerted by such motor coil. If the movement of the control motor 35 was such that the effective resistance of the rheostat 31 is increased, the pull of the motor coil 28 is decreased; so that the pull of the spring 27 predominates over that of the motor coil 28, and moves the shaft 23 and the secondary coils 19 of the phase-shifter 18 in a counter-clockwise direction (Fig. 1); to change the angle of time-phase displacement between the potential in the main circuit 10 and the derived potential on the circuit 20 in the proper direction to cause factor $f$ to return toward and eventually to zero, and so to cause factor $c$ to return toward and eventually to its equality with the sine of the angle of de-phasing of the phasing transformers 38, and desirably to unity as already stated. The movements of the control motor 35 and the movable part of the rheostat 31 and of the shaft 23 continues until factor $f$ again becomes equal to zero; at which time equilibrium has been produced between the opposing pulls of the motor coil 28 and the spring 27.

Such equilibrium continues, and the measuring wattmeter 16 gives a direct or indirect measurement of volt-amperes, so long as the power-factor of the main circuit remains constant; but upon any change in such power-factor the correction cycle above described is again initiated to produce equilibrium again between the opposing pulls of the motor coil 28 and the spring 27, to bring factor $f$ to zero and maintain it there, and to bring factor $c$ into equality with the sine of the de-phasing angle of the phasing transformers, and desirably to unity, and maintain it there so that the wattmeter measurement will be proportional to volt-amperes.

I claim as my invention:

1. A system for measuring the volt-amperes of a polyphase circuit, comprising a polyphase measuring wattmeter having current and potential coils, a separate polyphase wattmeter-type motor device also having current and potential coils, the current coils of said wattmeter and of said motor device being connected to be responsive to the current in the polyphase circuit to be measured, a polyphase phase-shifter having relatively movable primary and secondary windings, the primary windings of said phase-shifter being connected to be responsive to the potential of said polyphase circuit and the secondary windings thereof being connected to the potential coils of said wattmeter and of said motor device, and resistance loading means operated by said motor device for controlling the relative positions of the primary and secondary windings of said phase-shifter by varying the load on the phase-shifter secondary.

2. A system for measuring the volt-amperes of a polyphase circuit, comprising a polyphase measuring wattmeter having current and potential coils, a separate polyphase wattmeter-type motor device also having current and potential coils, the current coils of said wattmeter and of said motor device being connected to be responsive to the current in the polyphase circuit to be measured, a polyphase phase-shifter having relatively movable primary and secondary windings, the primary windings of said phase-shifter being connected to be responsive to the potential of said polyphase circuit and the secondary windings thereof being connected to the potential coils of said wattmeter and of said motor device, de-phasing transformers interposed in the connection to one of said sets of potential coils to cause a definite de-phasing between the potentials impressed on the wattmeter and on the motor device, and resistance loading means operated by said motor device for controlling the relative positions of the primary and secondary windings of said phase-shifter by varying the load on the phase-shifter secondary.

3. A system for measuring the volt-amperes of a polyphase circuit, comprising a polyphase measuring wattmeter having current and potential coils, a separate polyphase wattmeter-type motor device also having current and potential coils, the current coils of said wattmeter and of said motor device being connected to be responsive to the current in the polyphase circuit to be measured, a polyphase phase-shifter having relatively movable primary and secondary windings, the primary windings of said phase-shifter being connected to be responsive to the potential of said polyphase circuit and the secondary windings thereof being connected to the potential coils of said wattmeter and of said motor device, de-phasing transformers interposed in the connection to one of said sets of potential coils to cause a definite de-phasing between the potentials impressed on the wattmeter and on the motor device, a motor coil on said phase-shifter to shift relatively its primary and secondary windings, a variable resistance in the circuit of said motor coil and controlled by said motor device, and a spring opposing said motor coil and tending to relatively shift said phase-shifter windings in the opposite direction.

4. A system for measuring the volt-amperes of a polyphase circuit, comprising a polyphase measuring wattmeter having current and potential coils, a separate polyphase wattmeter-type motor device also having current and potential coils, the current coils of said wattmeter and of said motor device being connected to be responsive to the current in the polyphase circuit to be measured, a polyphase phase-shifter having relatively movable primary and secondary windings, the primary windings of said phase-shifter being connected to be responsive to the potential of said polyphase circuit and the secondary windings thereof being connected to the potential coils of said wattmeter and of said motor-device, de-phasing transformers interposed in the connection to one of said sets of potential coils to cause a definite de-phasing between the potentials impressed on the wattmeter and on the motor device, a motor coil on said phase-shifter to shift relatively its primary and secondary windings, a variable resistance in the circuit of said motor coil and controlled by said motor device, and means opposing said motor coil and tending to relatively shift said phase-shifter windings in the opposite direction.

5. A phase-shifter, comprising two relatively movable members, one of which has primary windings and the other secondary windings, biasing means tending to produce relative movement between said two members in one direction, a motor winding on said phase-shifter tending to produce relative movement of the members thereof in the direction opposite to that which the biasing means tends to produce, and means for varying the pull of said motor winding.

6. A phase-shifter, comprising two relatively movable members, one of which has primary windings and the other secondary windings, a spring tending to produce relative movement between said two members in one direction, a motor winding on said phase-shifter tending to produce relative movement of the members thereof in the direction opposite to that which the spring tends to produce, and means for varying the pull of said motor winding.

7. A phase-shifter, comprising two relatively movable members, one of which has primary windings and the other secondary windings, biasing means tending to produce relative movement between said two members in one direction, a close-circuited motor winding on said phase-shifter tending to produce relative movement of the members thereof in the direction opposite to that which the biasing means tend to produce, and means for varying the resistance of the circuit of said motor winding.

8. A phase-shifter, comprising two relatively movable members, one of which has primary windings and the other second windings, biasing means tending to produce relative movement between said two members in one direction, a motor winding on the secondary member of said phase-shifter tending by reaction with the primary member to produce relative movement of the members thereof in the direction opposite to that which the biasing means tends to produce, and means for varying the pull of said motor winding.

9. A system responsive to the volt-amperes of an alternating-current circuit, comprising an instrument responsive to the in-phase component of the product of current and potential secured from such circuit, a motor-device responsive to the quadrature time-phase component of such product, and phase-shifting means to vary the mutual time-phase relationship between said current and potential, said phase-shifting means including a circuit which contains a resistance that is varied by said motor-device and being operable to change the aforesaid mutual time-phase relationship by varying said resistance.

10. A system responsive to the volt-amperes of an alternating-current circuit, comprising an instrument responsive to an arbitrarily chosen time-phase component of the product of current and potential secured from such circuit, a motor-device responsive to a different component of such product but removed from the first component by a fixed time-phase angle, and phase-shifting means to vary the mutual time-phase relationship between said current and potential, said phase-shifting means including a circuit which contains an impedance that is varied by said motor-device and being operable to change the aforesaid mutual time-phase relationship by varying the impedance.

11. A phase-adjusting device, comprising relatively movable primary and secondary windings, said relative movement serving to shift the time-phase position of an electrical quantity of the secondary circuit with respect to the corresponding electrical quantity of the primary circuit while maintaining the proportionality between said quantities, and a variable impedance associated with said windings so that variations in said impedance cause corresponding variations in the adjustment between the primary and secondary windings.

12. A phase-adjusting device, comprising relatively movable primary and secondary windings, said relative movement serving to shift the time-phase position of an electrical quantity of the secondary circuit with respect to the corresponding electrical quantity of the primary circuit while maintaining the proportionality between said quantities, and a variable resistance associated with said windings so that variations in said resistance cause corresponding variations in the adjustment between the primary and secondary windings.

13. A system responsive to the volt-amperes of an alternating current circuit, comprising an instrument responsive to an arbitrarily chosen time-phase component of the product of current and potential secured from such circuit, a motor-device responsive to a different component of such product but removed from the first component by a fixed time-phase angle, phase shifting means to vary the mutual time-phase relationship between said current and potential, said phase shifting means comprising relatively movable primary and secondary windings, said relative movement serving to shift the time-phase position of the secondary electrical quantity with respect to the corresponding primary electrical quantity while maintaining the proportionality between said quantities, and a variable impedance associated with said windings so that variations in said impedance cause corresponding variations in the adjustment between the primary and secondary windings, said motor device being operable to change the aforesaid mutual time-phase relationship by varying said impedance.

14. A system responsive to the volt-amperes of an alternating current circuit, comprising a measuring instrument responsive to an arbitrarily chosen time-phase component of the product of current and potential secured from such circuit, a motor-device responsive to a different component of such product but removed from the first component by a fixed time-phase angle, a phase shifter through which potential is secured from the main circuit to supply said measuring instrument and said motor device, said phase shifter comprising relatively movable primary and secondary windings, said relative movement serving to shift the time-phase position of its primary winding potential with respect to its secondary winding potential while maintaining the proportionality between said potentials, and a variable impedance associated with said phase shifter so that variations in said impedance cause corresponding variations in the adjustment between the primary and secondary windings, the aforesaid motor-device being operable to change the time-phase relationship between the circuit potential and the potential supplied to the measuring instrument and motor-device by varying said impedance.

15. A phase-adjusting device, comprising relatively movable primary and secondary windings, said relative movement serving to shift the time-phase position of an electrical quantity of the secondary circuit with respect to the corresponding electrical quantity of the primary circuit while maintaining the proportionality between said quantities, loading means for at least a portion of said secondary windings comprising a circuit of variable impedance such that current flowing in said loading circuit causes a magnetic force which tends to move the secondary windings with respect to the primary windings, and a spring which opposes said magnetic force so that variations in said impedance cause corresponding variations in the adjustment between the primary and secondary windings.

16. A phase shifter comprising relatively movable primary and secondary windings, said relative movement serving to shift the time-phase position of the potential secured from the secondary with respect to the potential applied to the primary, loading means for the secondary comprising a circuit of variable impedance such that current flowing in said loading circuit causes a magnetic force which tends to move the secondary with respect to the primary, and force-producing means which opposes and balances said magnetic force at different values of current in said loading circuit so that variations in said impedance cause corresponding variations in the adjustment between the primary and secondary.

17. A system responsive to the volt-amperes of an alternating current circuit, comprising an instrument responsive to an arbitrarily chosen time-phase component of the product of current and potential secured from such circuit, a motor-device responsive to a different component of such product but removed from the first component by a fixed time-phase angle, phase shifting means to vary the mutual time-phase relationship between said current and potential, said phase shifting means comprising relatively movable primary and secondary windings, said relative movement serving to shift the time-phase position of potential produced in the secondary circuit with respect to the corresponding potential supplied to the primary circuit, loading means for at least a portion of said secondary windings comprising a circuit of variable impedanc such that current flowing in said loading circuit causes a magnetic force which tends to move the secondary windings with respect to the primary windings, and a spring which opposes said magnetic force so that variations in said impedance cause corresponding variations in the adjustment between the primary and secondary windings, the aforesaid motor-device being operable to change the aforesaid mutual time-phase relationship by varying said impedance.

18. A system responsive to the volt-amperes of an alternating current circuit, comprising a measuring instrument responsive to an arbitrarily chosen time-phase component of the product of current and potential secured from such circuit, a motor-device responsive to a different component of such product but removed from the first component by a fixed time-phase angle, and a phase shifter for supplying potential from the main circuit to the measuring instrument and the motor-device, said phase-shifter comprising relatively movable primary and secondary windings, loading means for the secondary comprising a circuit of variable impedance such that current flowing in said loading circuit causes a magnetic force which tends to move the secondary with respect to the primary, and force-producing means which opposes and balances said magnetic force at different values of current in said loading circuit so that variations in said impedance cause corresponding variations in the adjustment between the primary and secondary, the aforesaid motor-device being operable to change said loading circuit impedance.

19. A phase-adjusting device, comprising relatively movable primary and secondary windings, said relative movement serving to shift the time-phase position of an electrical quantity of the secondary circuit with respect to the corresponding electrical quantity of the primary circuit while maintaining the proportionality between said quantities, biasing means tending to cause relative motion in a given direction between said secondary and primary windings, a motor coil circuit which tends to produce a balancing force opposite to that produced by said biasing means when current flows in said circuit, and a variably adjustable impedance in said motor coil circuit so that variations in said impedance cause corresponding variations in the adjustment between the primary and secondary windings.

20. A phase-adjusting device as set forth in claim 19 in which adjustments in the variable impedance for the motor coil are made by a polyphase motor device having a current winding and a potential winding, one of said windings being supplied from the secondary winding of the phase-adjusting device, and the other of said windings being supplied from the same circuit that supplies the primary windings of the phase-adjusting device.

21. A polyphase potential phase-shifter, comprising relatively movable primary and secondary windings, said relative movement serving to shift the time-phase position of the polyphase potential supplied to the primary with respect to the potential derived from the secondary, spring biasing means tending to cause relative movement in a given direction between said secondary and primary windings, a motor coil circuit which tends to produce a balancing force opposite to that produced by said biasing means when current flows in said circuit, and a variable impedance in said motor coil circuit so that adjustments in said impedance cause corresponding variations in the adjustment between the primary and secondary windings.

22. A polyphase phase-shifter as set forth in claim 21 in which adjustments in the variable impedance for the motor coil are made by a polyphase motor-device having current and potential windings, the potential winding of said motor-device being supplied from the secondary of the phase-shifter, and the current winding being supplied with current from the same circuit that supplies the primary winding of the phase-shifter.

In witness whereof, I have hereunto set my hand at La Fayette, Indiana, this 25th day of February, A. D. one thousand nine hundred and thirty-one.

STANLEY S. GREEN.